UNITED STATES PATENT OFFICE.

CHRISTEN PHILLIP SÖRENSEN, OF COPENHAGEN, DENMARK.

PROCESS OF RENDERING ALUMINIUM CAPABLE OF BEING WELDED OR SOLDERED.

SPECIFICATION forming part of Letters Patent No. 708,840, dated September 9, 1902.

Application filed September 24, 1901. Serial No. 76,432. (No specimens.)

*To all whom it may concern:*

Be it known that I, CHRISTEN PHILLIP SÖRENSEN, chief plumber, a subject of the King of Denmark, residing at Holger Dasokes Vej Nr. 75, Copenhagen, in the Kingdom of Denmark, have invented a new and Improved Process for Rendering Aluminium Capable of being Welded or Soldered, of which the following is a specification.

Heretofore the soldering of aluminium has been unsuccessful owing to the fact that the metal will retain very little solder, the soldered parts being very brittle and the soldering breaking in a very short time.

My process overcomes the difficulties heretofore met with and renders aluminium capable of being successfully soldered, the metal treated maintaining this capability for a considerable time—viz., two or three months.

Owing to the difficulty in soldering aluminium the manufacturers have been compelled to issue the manufactured objects, as boilers or like vessels, in a complete form. With my process this is no longer necessary, as the constituent parts of the objects can be put together by the retail dealer, thus reducing the outlay for transportation of ready-made objects and the consequent cost to the purchaser.

In carrying out my process the parts to be soldered are heated over a fire up to about 300° centigrade, thus producing a strong oxidation of the metal. The parts are then treated in a concentrated lye of soda, which scours the metallic surface, and are then washed clean in cold water. The soldering operation is afterward carried on in the usual way without resorting to any mordant or flux. Experience has shown that a brazing alloy of zinc and brass filings or zinc and tin filings yields a very good result.

Having now described my invention, what I claim as new, and desire to secure by Letters Patent, is—

A process for rendering aluminium capable of being soldered, which consists in first heating the metal to about 300° centigrade, then subjecting it to the action of concentrated soda-lye, and finally rinsing with cold water.

In witness whereof I have hereunto set my hand in presence of two witnesses.

CHRISTEN PHILLIP SÖRENSEN.

Witnesses:
CHARLES HERELE,
MARIUS ANDERSÉN.